G. MITTS & R. MADDOX.
DISK PLANTER.
APPLICATION FILED OCT. 6, 1909.
990,451.
Patented Apr. 25, 1911.
2 SHEETS—SHEET 1.
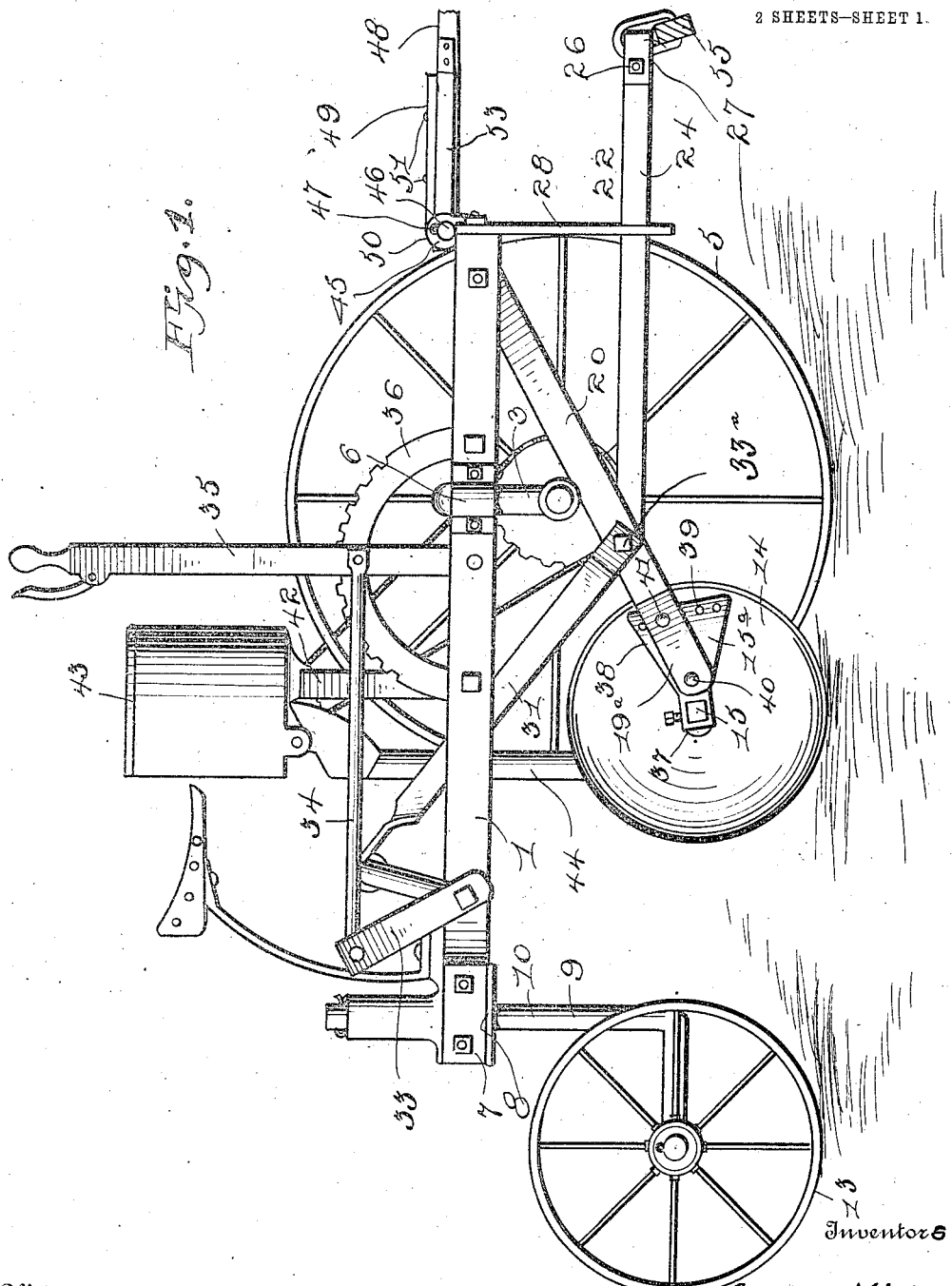
Witnesses
Inventors
George Mitts
and Ray Maddox.
By
Their Attorney.

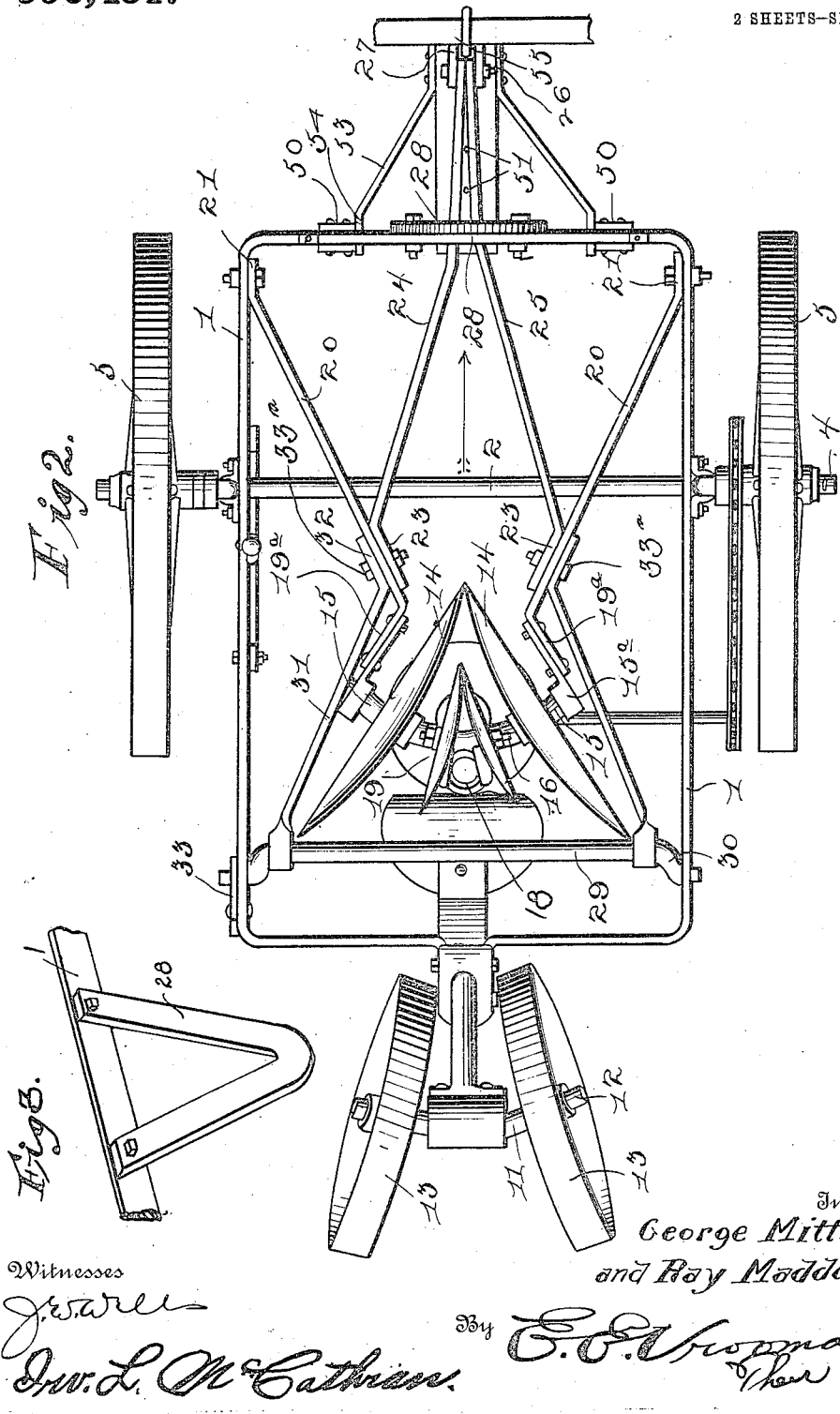

UNITED STATES PATENT OFFICE.

GEORGE MITTS, OF ALVA, OKLAHOMA, AND RAY MADDOX, OF GREAT BEND, KANSAS, ASSIGNORS TO GEORGE C. MITTS, OF ALVA, OKLAHOMA.

DISK PLANTER.

990,451. Specification of Letters Patent. Patented Apr. 25, 1911.

Application filed October 6, 1909. Serial No. 521,279.

*To all whom it may concern:*

Be it known that we, GEORGE MITTS, a citizen of the United States, residing at Alva, in the county of Woods and State of Oklahoma, and RAY MADDOX, a citizen of the United States, residing at Great Bend, in the county of Barton and State of Kansas, have invented certain new and useful Improvements in Disk Planters, of which the following is a specification, reference being had therein to the accompanying drawing.

This invention relates to corn planters, and has for its object the production of a device for forming deep furrows for receiving the seed-corn, so that the corn will be planted and covered some distance below the top of the ground.

It is a well known fact that it is desirable in some seasons to plant the corn deeper than in other sections, and, therefore, another object of my invention is the production of a device for facilitating the regulation of the depth of the furrows to be formed.

With these and other objects in view this invention consists of certain novel constructions, combinations and arrangements of parts, as will be hereinafter fully described and claimed.

In the drawings: Figure 1 is a side elevation of the planter. Fig. 2 is a bottom plan view of the same. Fig. 3 is a detail perspective of the guide bracket adapted to limit the downward movement of the draft member.

Referring to the drawings by numerals, 1 designates the frame, which carries an axle 2, which axle is provided with a vertical portion 3, which terminates into an angle portion 4 constituting a journal for the wheels 5, which are adapted to support the frame. The axle 2 is firmly held to the frame 1 by means of clamps 6, which are secured to the sides of the frame. The frame 1, preferably, consists in a square or oblong body portion having angle ends 7, which engage a journal 8, which journal supports an axle, or wheel-supporting member 9. The supporting member 9 is substantially L-shaped having its vertical-extending portion 10 secured within the journal and having its longitudinally-extending portion engaging an axle 11, which axle terminates, at its outer ends, in angularly disposed portions 12, upon which are mounted wheels 13, which act as a supporting device for the frame, and also cover the furrows, after the same have been opened by the furrow openers and the seed has been deposited therein. The supporting wheels or furrow-coverers are, preferably, positioned directly in the rear of the furrow openers and the seed depositor, as hereinafter described, so as to close the furrows, after the same have been opened and the seed deposited therein.

A pair of disks 14 are carried by the frame 1, and said disks are mounted upon the angularly-disposed ends 15 of the shaft 16, so as to bring the forward edges of the disks together. The shaft 16 supports the feed-chute 18, which chute carries, at its lower end, a pair of auxiliary disks 19 and the auxiliary disks 19 are placed directly in the rear of the primary disks or furrow disks 14, as fully shown in Fig. 2 of the drawings. It will be obvious that as the planter travels in the direction shown by the arrow, in Fig. 2 that the furrow formers, or the primary disks 14 will form a furrow, and after the same is formed the auxiliary disks 19 travel directly in the rear of the primary disks, and are positioned between the same, and will form a smaller furrow for depositing the seed. After the furrow has been formed and the seed planted the steering wheels will travel over the furrow and cover or close the furrow, thereby allowing the seed to be well planted, without the use of another machine or device.

The outer ends of the angularly-disposed ends 15 of the shaft 16 are secured to adjustable-connecting members 15ᵃ, which connecting members are secured to the angularly-extending ends 19ᵃ of the shaft-supporting members, which members have their upper ends 21 pivotally secured to the frame 1. A draft member 22 is secured to the shaft-supporting members 20, at 23, and comprises two side members 24 and 25, which members are brought together, near their forward ends, and secured together by means of a bolt 26, which bolt also secures a substantially U-shaped member 27 to said ends. The rear ends of the members 24 and 25 and the forward ends of the members 31 are secured to the shaft-supporting members 20, by means of bolts 33ᵃ. The substantially U-shaped portion 27, is connected to the trees hereinafter described, for allowing the device to be drawn across the field. Secured to the front of the frame 1, is a V-shaped bracket 28, which limits the downward movement of the draft member 22, and at all times, holds the same out of engagement with the ground.

Secured near the rear of the frame 1 is a shaft portion 29, which is provided with angularly-disposed ends 30, journaled in the sides of the frame 1. Link members 31 are fixedly secured to the shaft-supporting members 20, at 32, and are secured at their other end to the shaft portion 29, and said link members 31 support the shaft-supporting member 20, at its lower end, and regulate the depth of the furrow formed by means of the disks 14. An auxiliary link member 33 is secured to one of the angularly-disposed ends of the shaft member 29, and to this auxiliary link member 33 is secured a connecting rod 34, which connecting rod is secured to a lever 35 for swinging said auxiliary link member 33 and also the shaft portion 29. A rack 36 is carried by the frame 1, and the lever 35 is provided with means adapted to engage the rack for holding the lever in an adjusted position. It will, therefore, be seen that when the lever 35 is swung the link member 33 will also be swung, which will in turn swing the shaft portion 29, carrying the upper end of the connecting member 31, which will raise and lower disks 14 for the reason that the lower end of the connecting member 31 is connected to the shaft-supporting member 20.

The adjustable-connecting member 15ª is provided with a portion 37, which fits over the outer ends of the shaft 15 and the portion 37 terminates in a flared laterally-extending portion 38, which is provided, near its forward edge, with a plurality of apertures 39. The shaft-supporting members 20 are pivotally secured to the adjustable-connecting member 15ª near the junction portion 37 and the flared portion 38 by means of a pivot pin 40. A pin or bolt 41 passes through the angularly-extending end 19ª of the shaft-supporting members 20, and engages one of the apertures 39 for adjusting the flared portion upon the angularly-extending end 19ª and also regulating the depth of the disks 14. It will, therefore, be obvious that we have provided two separate means for regulating the depth of the disks.

It will be obvious that as the device or machine is drawn forward by means of the draft member 22 that since the same will pull upon the shaft-supporting member 20, the disks 14 will be caused to more forcibly engage the soil, and, therefore, more easily form a furrow.

Secured to the frame 1 is a bracket member 42, which supports a seed receptacle 43, which receptacle is provided with a tube 44 communicating therewith and adapted to direct the seed into the feed-chute 18.

From the foregoing description, it will be readily seen that we have provided efficient means for regulating the depth of the disks, and also means for readily forming a furrow, depositing the seed, and after the seed is deposited, covering or closing the furrow.

Journal brackets 45 are secured to the front of the frame 1 and within the journal brackets 45 is journaled a shaft 46. The pins 47 pass through the shaft near the outer ends thereof and engage the outer edges of the journal brackets 45 and prevent the longitudinal movement of the shaft within the journal brackets 45. A tongue 48 is secured to the shaft 46 by means of the plate or connecting member 49. The plate 49 is rolled at its rear end as at 50 and straddles the shaft 46, thereby connecting the tongue 48 thereto. The plate 49 is secured to the tongue 48 by means of rivets or bolts 51. The plate 49 is prevented from lateral movement upon the shaft 46 by means of pins which are positioned upon each side of the plate 49 and pass through the shaft 46. Angle braces 53 are secured to the tongue 48 and engage at their rear ends 54 the shaft 46. The trees 55 are connected directly to the substantially U-shaped member 27 before mentioned and it will be obvious that the planter will be drawn forward through the medium of the draft member 22. It will also be obvious that the planter can be readily stopped through the medium of the tongue which is rigidly secured to the frame 1.

What we claim is:

1. In a device of the class described, the combination with a frame, of disk-supporting members secured at their upper ends to said frame and provided with angularly disposed lower ends, a draft member comprising a pair of side members secured together at their outer ends, means secured to the outer ends of said side members for allowing draft means to be connected thereto, a bracket member carried by the front of said frame, said draft member adapted to pass therethrough, and said bracket adapted to limit the downward movement of said draft member, disks carried by said angularly disposed ends of said shaft-supporting members, and means coöperating with said disk-supporting members for raising and lowering the same.

2. In a device of the class described, the combination with a frame, of disk-supporting members secured at their upper ends to said frame and provided with laterally flared lower ends, a V-shaped draft member comprising a pair of side members secured together at their forward ends and provided with laterally extending rear ends, means secured to the outer ends of said side members for allowing draft means to be connected thereto, a V-shaped bracket member carried by the front of said frame, said draft member passing through said bracket member, and said bracket adapted to limit the downward movement of said draft member, and link members connected at their inner ends to the inner ends of said draft member, and at their other ends to said frame, and adapted to limit the lateral swing of the rear end of said draft member.

In testimony whereof we hereunto affix our signatures in presence of two witnesses.

GEORGE MITTS.
RAY MADDOX.

Witnesses to signature of George Mitts:
F. C. GALLON,
M. D. PARKER.

Witnesses to signature of Ray Maddox:
F. B. MILLARD,
LOREN BOYD.